Figure 3:
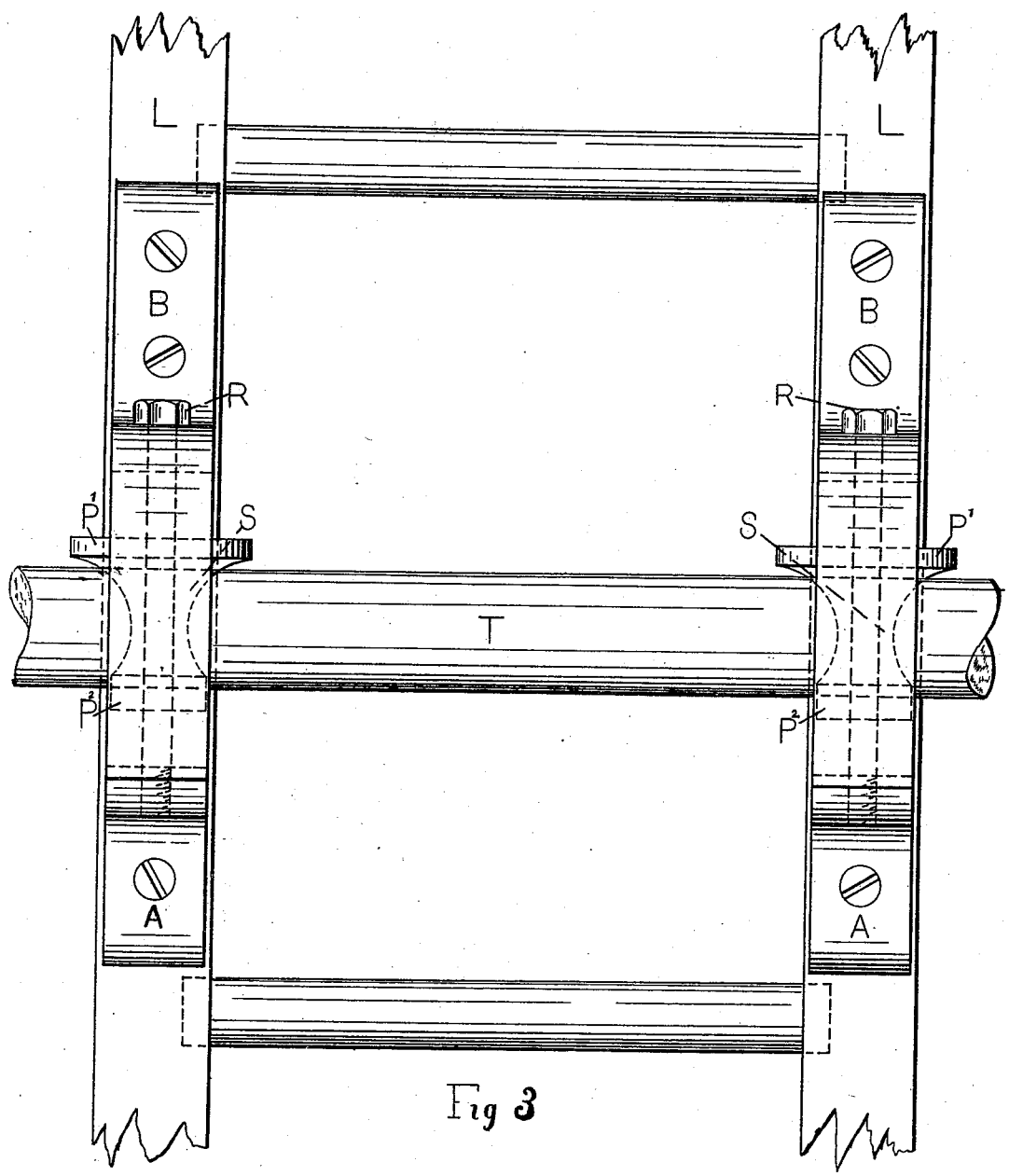

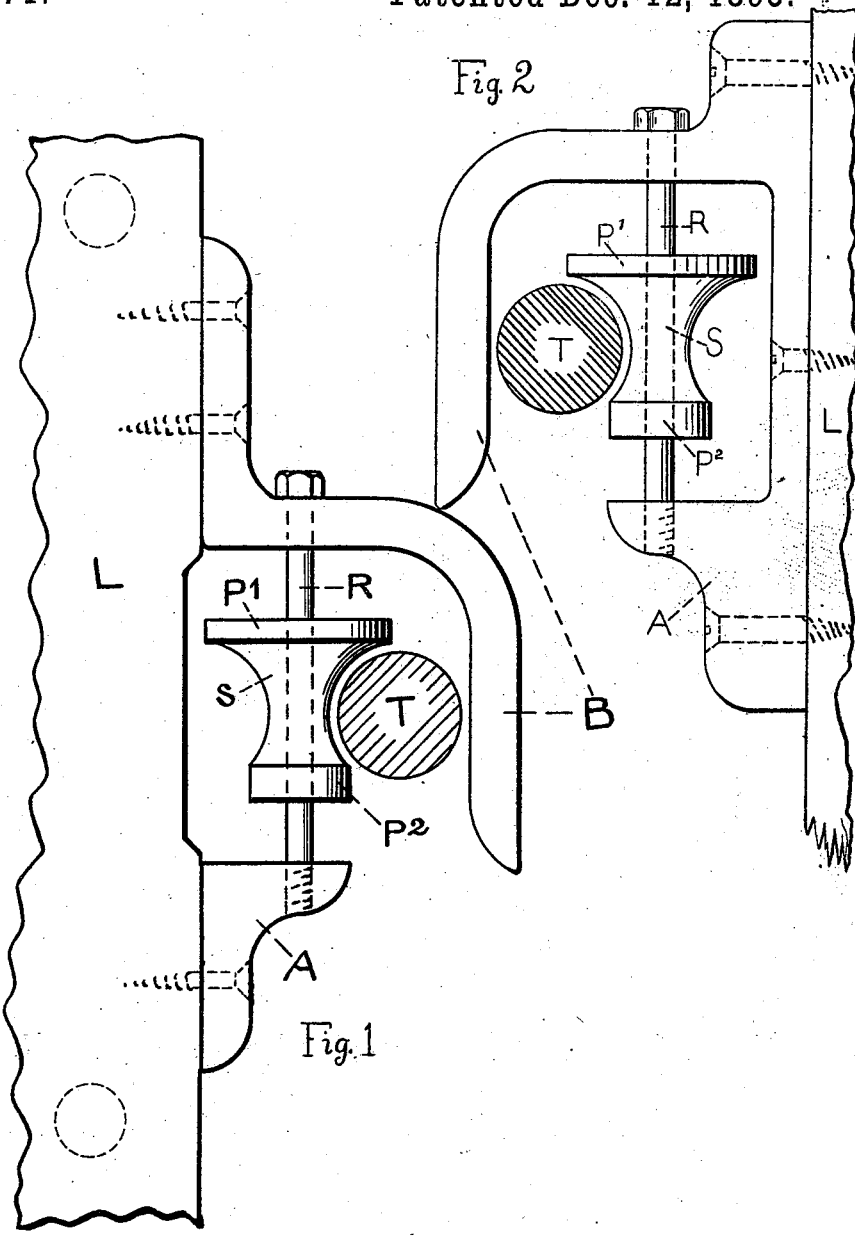

(No Model.) 2 Sheets—Sheet 2.

G. H. CRAM.
ANTIFRICTION ATTACHMENT FOR BICYCLE STEP LADDERS.

No. 510,471. Patented Dec. 12, 1893.

WITNESSES: INVENTOR

UNITED STATES PATENT OFFICE.

GEORGE H. CRAM, OF BELOIT, WISCONSIN.

ANTIFRICTION ATTACHMENT FOR BICYCLE STEP-LADDERS.

SPECIFICATION forming part of Letters Patent No. 510,471, dated December 12, 1893.

Application filed April 28, 1893. Serial No. 472,273. (No model.)

*To all whom it may concern:*

Be it known that I, GEORGE H. CRAM, a citizen of the United States, residing at Beloit, in the county of Rock and State of Wisconsin, have invented a new and useful Improvement in Antifriction Attachments for Bicycle Step-Ladders, of which the following is a specification.

My invention, an "anti-friction attachment" for bicycle step ladders, is for the purpose of facilitating the movement, easily and without friction, of the bicycle step ladder from one end of the shelving to which it is attached by means of a trolley rod to the other; and it consists in the arrangement of rollers, their journals and brackets, attached to the top end of a ladder as hereinafter described and claimed.

In the drawings, Figures 1 and 2, are side views of my improved anti-friction attachment for bicycle step ladders, with the ladder "L" broken off. Fig. 3 is a view, showing the two sides of the ladder "L," the trolley rod "T" broken off, and ladder "L" broken off, as both the ladder and the trolley rod are to be made of suitable length to suit the position into which they may be placed; and also shows my anti-friction spools and their brackets attached to each side L—L of the ladder.

To make my specification as brief as possible I describe only one of my anti-friction attachments, but in practice I have to use two, one on each side of the ladder "L" as shown in Fig. 3.

Two brackets, "A" and "B," Fig. 1, (or, if preferred the brackets may be in one piece "A" as in Fig. 2) with the curved extension "B" projecting from the top bracket downward, and in the rear of the trolley rod "T," and are screwed on to the upper part and back side of the ladder. Attached to these brackets is the rod "R," serving as a journal for the spool "S." The arm on the upper bracket extending over and beyond the trolley rod "T" which is attached to the shelving, is to prevent the ladder from tipping backward when one is ascending the same. The arms on the two brackets receiving the rod "R" are some little distance apart, the rod being longer than the spool, for the purpose of allowing the same to raise or lower to conform to the different heights of the trolley rod, there being a necessary variation in the height of the trolley by reason of greater or less weight being placed upon the shelving to which it is attached.

The spool is provided with flanges "P'" and "P²" the upper flange "P'" being larger than the other so as to extend over the trolley rod, thus keeping the spool in position on the rod.

What I claim as my invention above described, and desire to secure Letters Patent upon, is this—

1. The combination with a step ladder, of a roller attachment secured to the upper part and back side of the ladder, said attachment consisting of a spool, provided with curved bearing surface and revolving on an axis parallel to and longitudinal of the ladder, substantially as described.

2. Combination of bracket "B" with a curved arm, short bracket "A," rod "R," spool "S," for purpose specified.

3. Combination of bracket "B" with curved arm, bracket "A," spool "S" with large flange on top, and trolley rod "T" as specified.

4. Combination of brackets "A" and "B," rod "R" spool "S," said spool "S" having large flange on one end, and small flange on its other end, as and for the purpose set forth.

5. Combination of rod "R" suitable brackets as "A" and "B," spool "S" to slide freely on said rod "R," and at the same time being capable of revolving freely on said rod "R" and bearing between its flanges on trolley rod "T" as and for the purposes set forth.

GEORGE H. CRAM.

Witnesses:
J. B. DOW,
JOHN E. FINNEGAN.